United States Patent
Bevilacqua et al.

(10) Patent No.: US 9,007,304 B2
(45) Date of Patent: Apr. 14, 2015

(54) METHODS AND APPARATUSES FOR GESTURE-BASED USER INPUT DETECTION IN A MOBILE DEVICE

(75) Inventors: Mathew William Bevilacqua, San Francisco, CA (US); Newfel Harrat, Burlingame, CA (US); Peter Ring, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 13/198,455

(22) Filed: Aug. 4, 2011

(65) Prior Publication Data

US 2012/0056801 A1    Mar. 8, 2012

Related U.S. Application Data

(60) Provisional application No. 61/379,669, filed on Sep. 2, 2010.

(51) Int. Cl.
*G09G 5/00* (2006.01)
*G06F 3/033* (2013.01)
*G06F 3/0346* (2013.01)
*G06F 3/0488* (2013.01)
*G06F 3/01* (2006.01)

(52) U.S. Cl.
CPC .......... *G06F 3/0346* (2013.01); *G06F 3/04883* (2013.01); *G06F 3/017* (2013.01)

(58) Field of Classification Search
CPC .............................. G06F 3/0338; G06F 3/0346
USPC .................................................. 345/156–184
See application file for complete search history.

(56) References Cited

U.S. PATENT DOCUMENTS

| | | | |
|---|---|---|---|
| 5,656,804 A | 8/1997 | Barkan et al. | |
| 8,138,479 B2 | 3/2012 | Kothari et al. | |
| 8,423,076 B2 * | 4/2013 | Kim et al. | 455/550.1 |
| 8,462,109 B2 * | 6/2013 | Nasiri et al. | 345/158 |
| 2006/0164382 A1 * | 7/2006 | Kulas et al. | 345/156 |

(Continued)

FOREIGN PATENT DOCUMENTS

| | | |
|---|---|---|
| EP | 1983730 A1 | 10/2008 |
| GB | 2451943 A | 2/2009 |

(Continued)

OTHER PUBLICATIONS

Anonymous,"Accelerometer", Jul. 10, 2010, pp. 1-6, XP55033630, Wikipedia Retrieved from the Internet: URL: http://en.wikipedia.org/w/index.php?title=Accelerometer&oldid=372728672 [retrieved on Jul. 23, 2012].

(Continued)

*Primary Examiner* — Dmitriy Bolotin
(74) *Attorney, Agent, or Firm* — Muncy, Geissler, Olds & Lowe, P.C.

(57) ABSTRACT

Methods and apparatuses are provided that may be implemented in a mobile device to: determine whether the mobile device is in a gesture command input ready state based, at least in part, on a display portion of the mobile device remaining in a horizontal viewable position for a threshold period of time; with the mobile device in a gesture command input ready state, determine whether a detected movement of the mobile device represents a gesture command input; and in response to the determined gesture command input, affect a user perceivable output.

38 Claims, 3 Drawing Sheets (A)

(B)

(56) References Cited

U.S. PATENT DOCUMENTS

| | | |
|---|---|---|
| 2007/0113207 A1 | 5/2007 | Gritton |
| 2007/0176898 A1* | 8/2007 | Suh ............... 345/158 |
| 2008/0229255 A1 | 9/2008 | Linjama et al. |
| 2009/0088204 A1* | 4/2009 | Culbert et al. ............. 455/556.1 |
| 2009/0170532 A1* | 7/2009 | Lee et al. .................. 455/456.3 |
| 2009/0197615 A1* | 8/2009 | Kim et al. ................. 455/456.1 |
| 2009/0197635 A1* | 8/2009 | Kim et al. ................. 455/550.1 |
| 2009/0262074 A1* | 10/2009 | Nasiri et al. ................ 345/158 |
| 2009/0265627 A1* | 10/2009 | Kim et al. ..................... 715/702 |
| 2009/0303204 A1* | 12/2009 | Nasiri et al. ................ 345/184 |
| 2010/0033422 A1* | 2/2010 | Mucignat et al. ............. 345/156 |
| 2010/0160004 A1 | 6/2010 | Alameh et al. |
| 2010/0207871 A1 | 8/2010 | Reponen et al. |
| 2010/0214216 A1* | 8/2010 | Nasiri et al. ................ 345/158 |
| 2010/0271400 A1* | 10/2010 | Suzuki et al. ................ 345/660 |
| 2011/0157231 A1* | 6/2011 | Ye et al. ....................... 345/649 |
| 2011/0254800 A1* | 10/2011 | Anzures et al. ............... 345/173 |
| 2013/0265225 A1* | 10/2013 | Nasiri et al. ................ 345/156 |

FOREIGN PATENT DOCUMENTS

| | | |
|---|---|---|
| JP | 2005012297 A | 1/2005 |
| JP | 2006229549 A | 8/2006 |
| JP | 2007509448 A | 4/2007 |
| JP | 2008053988 A | 3/2008 |
| JP | 2008129006 A | 6/2008 |
| JP | 2009222921 A | 10/2009 |
| JP | 2010102614 A | 5/2010 |
| KR | 20080093808 A | 10/2008 |
| WO | WO2009096644 A1 | 8/2009 |
| WO | 2010085286 | 7/2010 |

OTHER PUBLICATIONS

International Search Report and Written Opinion—PCT/US2011/046835, ISA/EPO—Oct. 20, 2011.

Kunze, et al., "Which way am I facing: Inferring horizontal device orientation from an accelerometer signal," 2009 International Symposium on Wearable Computers, ISWC '09, pp. 149-150.

* cited by examiner

METHODS AND APPARATUSES FOR GESTURE-BASED USER INPUT DETECTION IN A MOBILE DEVICE

This patent application claims benefit of and priority to co-pending U.S. Provisional Patent Application 61/379,669, filed Sep. 2, 2010, Titled, "A Method for Orientation and Directional Shake Detection Using an Acceleration Sensor", and which is hereby incorporated by reference in its entirety.

BACKGROUND

1. Field

The subject matter disclosed herein relates to electronic devices, and more particularly to methods and apparatuses for use in a mobile device capable of receiving gesture-based user inputs.

2. Information

Mobile devices, such as hand-held mobile devices like smart phones or other types of cell phones, tablet computers, digital book readers, personal digital assistants, gaming devices, etc., may perform a variety of functions. For example, certain mobile devices may provide voice and/or data communication services via wireless communication networks. For example, certain mobile devices may provide for audio and/or video recording or playback. For example, certain mobile devices may provide for various applications relating to games, entertainment, electronic books, utilities, location based services, etc.

Mobile devices may comprise a variety of different input devices and/or related techniques for receiving user inputs. For example, a mobile device may comprise various buttons, switches, a touch pad or other like touch or proximity sensors, etc. Some mobile devices may receive user inputs through voice commands captured via a microphone. Some mobile devices may receive user inputs through image-based commands captured via a camera (still or video).

Certain mobile devices may employ various sensors, such as inertial and/or environment sensors, which provide signals for use by a variety of functions including, for example, detecting movements of a mobile device by a user and determining whether such movements are a particular gesture-based user input (gesture command input). It is not unusual for certain mobile devices to be significantly shuffled about or otherwise effected by a user when simply carrying a mobile device on or near the user's body as the user goes about their various daily routines. As such, for this reason and others, it may be useful to carefully determine whether a detected movement should or should not be considered as possibly relating to a gesture command input.

SUMMARY

In accordance with one aspect, a method may be implemented at a mobile device. In one example implementation, a method may comprise: subsequent to initiation of a user perceivable output, determining whether the mobile device is in a gesture command input ready state based, at least in part, on a display portion of the mobile device remaining in a horizontal viewable position for a threshold period of time; with the mobile device in the gesture command input ready state, determining whether a detected movement of the mobile device represents a gesture command input; and in response to a determination that the detected movement represents the gesture command input, affecting the user perceivable output.

In accordance with another aspect, an apparatus may be provided for use in a mobile device. In one example implementation, an apparatus may comprise: means for initiating a user perceivable output; means for determining whether the mobile device is in a gesture command input ready state subsequent to initiating the user perceivable output based, at least in part, on a display portion of the mobile device remaining in a horizontal viewable position for a threshold period of time; means for detecting movement of the mobile device; means for determining whether the detected movement of the mobile device represents a gesture command input with the mobile device in the gesture command input ready state; and means for affecting the user perceivable output, in response to the determined gesture command input.

In accordance with yet another aspect, a mobile device may be provided. In one example implementation, a mobile device may comprise: one or more output devices, comprising at least a display device; one or more inertial sensors; and a processing unit. The processing unit may be, for example, subsequent to initiation of a user perceivable output via at least one of the one or more output devices; determine whether the mobile device is in a gesture command input ready state based, at least in part, on the display device remaining in a horizontal viewable position for a threshold period of time; determine whether a movement of the mobile device represents a gesture command input with the mobile device in the gesture command input ready state, the movement being based, at least in part, on at least one signal associated with at least one of the one or more inertial sensors; and affect the user perceivable output, in response to the determined gesture command input.

In accordance with still another aspect, an article of manufacture may be provided. In one example implementation, an article of manufacture may comprise a non-transitory computer readable medium having stored therein computer executable instructions executable by a processing unit of a mobile device to, subsequent to initiation of a user perceivable output: determine whether the mobile device is in a gesture command input ready state based, at least in part, on a display portion of the mobile device remaining in a horizontal viewable position for a threshold period of time; with the mobile device in the gesture command input ready state, determine whether a detected movement of the mobile device represents a gesture command input; and in response to a determination that the detected movement represents the gesture command input, affect the user perceivable output.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
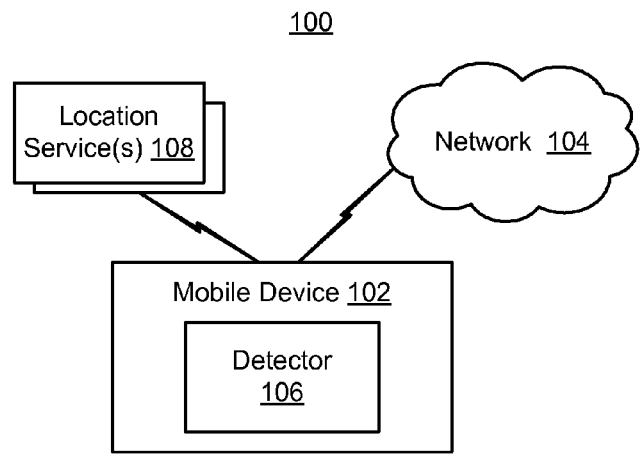
FIG. 1 is a schematic block diagram illustrating an exemplary environment that includes a mobile device comprising a gesture command input detector that determines whether the mobile device is in a gesture command input ready state, in accordance with an implementation.

According to certain example implementations, a mobile device may be enabled to selectively operate in a gesture command input ready state in which certain gesture-based user inputs (gesture command inputs) may be received.

For example, in certain implementations a gesture command input detector and/or other like logic may be provided in a mobile device to determine whether the mobile device is in a gesture command input ready state. A mobile device that is determined to be in a gesture command input ready state may, for example, receive certain gesture command inputs. Conversely, a mobile device that is determined to not be in a gesture command input ready state may, for example, not receive certain gesture command inputs. While the examples provided herein tend to relate to one gesture command input ready state it should be kept in mind that in certain example implementations, there may be a plurality of different gesture command input ready states, which may relate to some of the same and/or different gesture command inputs. Hence, a gesture command input detector and/or other like logic may be provided in a mobile device to determine whether the mobile device is in one or more gesture command input ready states.

In certain example implementations, a gesture command input detector and/or other like logic may determine whether a mobile device is in a gesture command input ready state based, at least in part, on a display portion of the mobile device remaining in a horizontal viewable position for a threshold period of time. Hence, with a mobile device in a gesture command input ready state, a gesture command input detector and/or other like logic may determine whether a detected movement of the mobile device, e.g., intentionally by a user, represents a gesture command input. In response to a determined gesture command input, a gesture command input detector and/or other like logic may affect a user perceivable output and/or other like associated function performed by or otherwise support by a mobile device in some manner.

For example, an alarm clock function may operate to activate an alarm using one or more output device(s) as part of an alarm activation process. For example, an alarm may comprise a sound, a light, a display, a vibration, etc., or some combination thereof. With an alarm activated, for example, a user may pick-up a mobile device and hold the mobile device steady or somewhat steady in their hand(s) in an applicable "horizontal viewable position" for an applicable threshold period of time to place the mobile device in a gesture command input ready state. The user may then move the mobile device about accordingly to perform one or more gestures, which may be received by the mobile device and which may initiate deactivation of the alarm, for example. Thus, for example, a user may have a mobile device in a purse or pocket and in response to hearing an audible alarm may remove the mobile device from the purse or pocket, hold the mobile device steady in their hand(s) in a horizontal viewable position for a second or two, and then shake or otherwise move the mobile device in some predetermined manner to deactivate (e.g., sleep/delay, turn off) the audible alarm.

In certain example implementations, a mobile device may determine whether it is in a gesture command input ready state based further, at least in part, on a current user motion state. For example, a mobile device may be determined to be in a gesture command input ready state in response to a current user motion state indicating that the user is not walking (e.g., strolling, running, etc., with some detected gait movement pattern). For example, a current user motion state may be determined based, at least in part, on signals generated by one or more inertial and/or environment sensors that are responsive to movement or motion of the mobile device within an environment.

In certain example implementations, a mobile device may determine whether it is in a gesture command input ready state based further, at least in part, an estimated location of the mobile device within an environment, e.g., relating to one or more of: geographical coordinates, a location identified in an electronic map, an estimated velocity relating to movement of the mobile device, an elevation, etc. For example, there may be certain locations wherein gesture command inputs may be discouraged or less practical, such as, for example, a theater, an airport, a hospital, a school, a conference room, on board a moving vehicle, etc. For example, there may be certain locations wherein a mobile device may be subjected to more than a threshold level of detected movements (e.g., vibrations, accelerations, etc.) by some mechanism other than the user (e.g., an elevator, a moving vehicle, etc.) such that it may be difficult to distinguish an actual intended gesture command input from an unintentional gesture-like input.

In certain example implementations, a mobile device may determine whether a detected movement of the mobile device represents a gesture command input based, at least in part, on a passage of time (e.g., associated with a second threshold period of time) since receiving a user input. For example, it may be useful for a mobile station to wait for several seconds from a previous non-gesture based user input (e.g., a voice input, a button input, a touch screen input, etc.) before allowing the mobile station to be placed in a gesture command input ready state.

In certain example implementations, a mobile device may determine whether a display portion (e.g., a display device, or other like visual feedback based output device) of the mobile device is in a horizontal viewable position based, at least in part, on an orientation of the mobile device with respect to a detected gravitational acceleration (e.g., Earth's gravity) and/or a detected external light source (e.g., the Sun, an overhead light, etc.).

In certain example implementations, a mobile device may, in response to affecting a user perceivable output based on a detected gesture command input, initiate one or more additional user perceivable outputs. For example, additional user feedback may be produced to indicate that a gesture command input was received and that the user perceivable output and/or other like function has been affected in some manner.

By way of initial example, a mobile device may comprise a cell phone, a smart phone, a computer, a tablet, a navigation aid, a digital book reader, a gaming device, music and/or video player device, a camera, etc.

FIG. 1, for example, illustrates an environment 100 in which a mobile device 102 may be provided and moved about. Mobile device 102 is representative of any such electronic device having at least one output device through which information may be communicated to a user. For example, a user perceivable output may comprise an audible output, a visual output, or a tactile output.

As illustrated, mobile device 102 may comprise a gesture command input detector 106. Gesture command input detector 106 is representative of circuitry, such as, e.g., hardware, firmware, a combination of hardware and software, and/or a combination of firmware and software or other like logic may be provided in a mobile device to determine whether the mobile device is in a gesture command input ready state.

In certain example implementations, mobile device 102 may function exclusively and/or selectively as a stand-alone device, and/or may provide a one or more capabilities/services of interest/use to a user. In certain example implementations, mobile device 102 may communicate in some manner with one or more other devices, for example, as illustrated by the wireless communication link to the cloud labeled network 104. Network 104 is representative of one or more communication and/or computing resources (e.g., devices and/or services) which mobile device 102 may communicate with or through using one or more wired or wireless communication links. Thus, in certain instances mobile device 102 may receive (or send) data and/or instructions via network 104.

In certain example implementations, mobile device 102 may be enabled to use signals received from one or more location services 108. Location service(s) 108 is representative of one or more wireless signal based location services such as, a Global Navigation Satellite System (GNSS), or other like satellite and/or terrestrial locating service, a location based service (e.g., via a cellular network, a WiFi network, etc.).

Mobile device 102 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Figure 2:
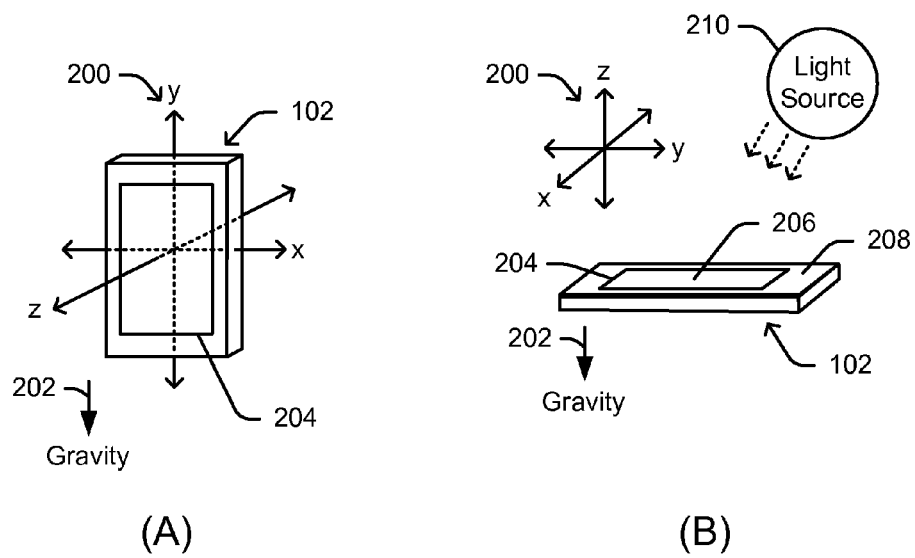
FIG. 2A is an illustrative diagram showing a mobile device, for example, as in FIG. 1, having a non-horizontal orientation, in accordance with an implementation.
FIG. 2B is an illustrative diagram showing a mobile device, for example, as in FIG. 1, having a substantially horizontal orientation, in accordance with an implementation.

FIG. 2A graphically illustrates a simple example of a mobile device 102 having an orientation that may, for example, be associated with and hence represented by a coordinate system, such as that shown by axis 200 labeled x, y, and z, with an origin that may be placed at a reference point associated with the mobile device. Such reference point may, for example, be centered or offset in some manner.

In this example and also the similar example in FIG. 2B, the orientation is intended to be associated with a display 204 (e.g., a main display, which may also serve as a touch screen). Hence, the body or other portions of mobile device 102 may take any reasonable form or shape. It should also be noted that while the examples illustrated herein show a rectangular shaped display 204, claimed subject matter is not so limited.

In FIG. 2A and as further illustrated in FIG. 2B, display 204 may comprise a surface 206 (FIG. 2B) that may be associated with an x-y plane. Thus, in FIG. 2A, the x-y plane (and hence display 204) is substantially parallel to vector 202 associated with a detected gravitational acceleration of Earth. As such, in FIG. 2A, mobile device 102 may be considered to be in a substantially vertical viewable position. To the contrary, in FIG. 2B, the x-y plane (and hence display 204) is substantially perpendicular to vector 202 associated with a detected gravitational acceleration of Earth. As such, in FIG. 2B, mobile device 102 may be considered to be in a substantially horizontal viewable position.

In certain implementations, gesture command input detector 106 may determine whether mobile device 102 is in a gesture command input ready state based, at least in part, on display 204 of mobile device 102 remaining in a horizontal viewable position for a threshold period of time.

Although FIG. 2A and FIG. 2B illustrate ideal vertical and horizontal viewable positions, respectively, it should be understood that, unless stated otherwise, the term "horizontal viewable position" is intended to represent various orientations of display 204 that may be within a threshold range of angles of an x-y plane. For example, display 204 may be determined to be in a horizontal viewable position while its surface 206 is on a tilted plane that falls within a threshold limit of angles of perfectly horizontal x-y plane, e.g., no roll (rotation about the x-axis) and no pitch (rotation about the y-axis). It should be understood that the amount of such tilt (e.g., roll and/or pitch, as may be defined via one or more threshold angle values) may depend upon the type of mobile device, etc. Thus, in certain example implementations, a threshold angle of plus or minus thirty degrees in roll or pitch may be determined to represent a horizontal viewable position. However, in certain other example implementations, a threshold angle of plus ten degrees or minus five degrees in roll or plus may be determined to represent a horizontal viewable position. It should also be understood that there may be different threshold angles for roll and pitch. Further, it should be understood that in certain example implementations, additional information such as, yaw (rotation about the z-axis) may also be considered in determining whether display 204 may be in a horizontal viewable position.

As illustrated in FIG. 2A and FIG. 2B, in certain example implementations, an orientation of display 204 may be based, at least in part, on a detected gravitational acceleration (e.g., as detected using one or more sensors).

In certain example implementations, as further illustrated in FIG. 2B, an orientation of display 204 may be based, at least in part, on light from an external light source 210 falling on mobile device 102. For example, an amount of light from the Sun or other overhead light source or an absence thereof may be detected (e.g., using one or more sensors arranged on or within side 208) to identify or help to identify whether display 204 remains in a horizontal viewable position for a threshold period of time.

Figure 3:
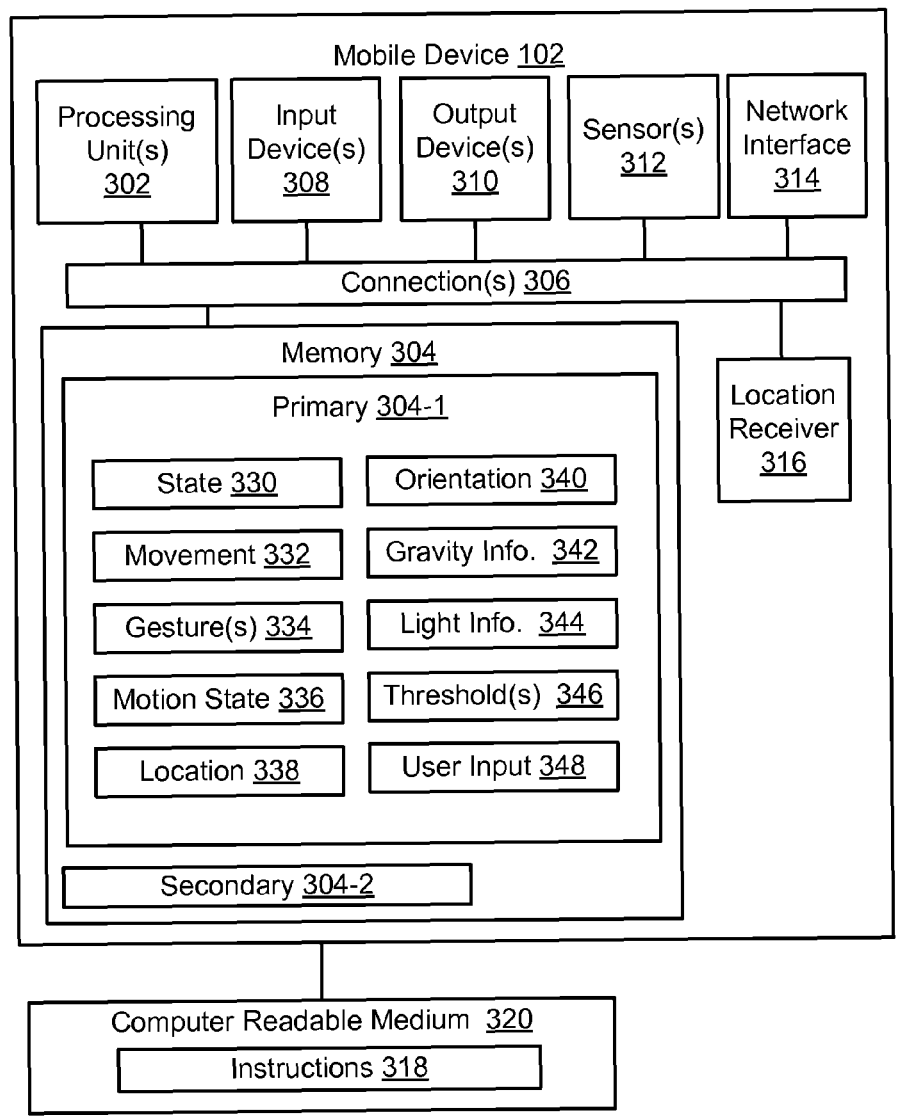
FIG. 3 is a schematic block diagram illustrating certain features of a mobile device, for example, as in FIG. 1, enabled to determine whether it is in a gesture command input ready state, in accordance with an implementation.

Reference is made next to FIG. 3, which is a schematic block diagram illustrating certain features of mobile device 102, for example as in FIG. 1, in accordance with an implementation.

As illustrated mobile device 102 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 320. Memory 304 and/or computer readable medium 320 may comprise instructions 318 associated with data processing (e.g., in accordance with the techniques and/or gesture command input detector 106, as provided herein).

Mobile device 102 may, for example, further comprise one or more user input devices 308, one or more output devices 310, one or more sensors 312, one or more network interfaces 314, and/or one or more location receivers 316.

Input device(s) 308 may, for example, comprise various buttons, switches, a touch pad, a trackball, a joystick, a touch screen, a microphone, a camera, and/or the like, which may be used to receive one or more user inputs. Additionally, one or more sensors 312 may also be used to receive user inputs, e.g., based on detectable movements or other like gestures. Input device(s) 308 may, for example, provide or otherwise be associated with one or more signals stored in memory 304, such as, user inputs 348.

Output devices 310 may, for example, comprise a display 204 (FIG. 2A-B), such as, a liquid crystal display (LCD), a touch screen, and/or the like, or possibly, one or more lights, light emitting diodes (LEDs), etc., which may be used in producing a visual output for a user. Output devices 310 may, for example, comprise a speaker, a headphone jack/headphones, a buzzer, a bell, etc., which may be used in producing an audible output for a user. Output devices 310 may, for example, comprise a vibrating device, a mechanically movable device, a thermally active device (e.g., which selectively heats up or cools down), and/or other like mechanism which may be used in producing a tactile output for a user.

Sensors 312 may, for example, comprise one or more inertial sensors (e.g., an accelerometer, a magnetometer, a gyroscope, etc.), and/or one or more environment sensors (e.g., a barometer, a compass, a magnetometer, a light detector, and/or the like), which may be used in identifying a motion direction, determining an orientation, and/or otherwise provide information that may be considered in determining whether or not mobile device 102 may be in a gesture command input ready state, e.g., based, at least in part, on a display portion being in a horizontal viewable position for at least a threshold period of time. Sensors 312 may, for example, provide or otherwise be associated with one or more signals stored in memory 304, such as, one or more movements 332, gestures 334, an orientation 340, gravity information 342, and/or light information 344 (e.g., associated with an external light source 210 (FIG. 2B)). One or more of a movement 332, a gesture 334, an orientation 340, gravity information 342, and/or light information 344 may, for example, be considered by a gesture command input detector 106 (FIG. 1) in determining whether a mobile device 102 may be in a gesture command input ready state 330.

A network interface 314 may, for example, provide connectivity to one or more networks 104 (FIG. 1), e.g., via one or more wired and/or wireless communication links. Location receiver 316 may, for example, obtain signals from one or more location services 108 (FIG. 1), which may be used in estimating a location 338 that may be provided to or otherwise associated with one or more signals stored in memory 304. Location 338 may, for example, be considered by a gesture command input detector 106 (FIG. 1) in determining whether a mobile device 102 may be in a gesture command input ready state 330.

Processing unit 302 and/or instructions 318 may, for example, provide or otherwise be associated with one or more signals stored in memory 304, such as, a gesture command input ready state 330, various threshold values 346 and/or other like threshold ranges (e.g., as described in the various example techniques herein). One or more threshold values 346 may, for example, be considered by a gesture command input detector 106 (FIG. 1) in determining whether a mobile device 102 may be in a gesture command input ready state 330.

Processing unit 302 and/or instructions 318 may, for example, provide or otherwise be associated with one or more signals stored in memory 304, such as, a motion state 336. For example, motion state 336 may indicate whether a user associated with a mobile device 102 may or may not be walking. Motion state 336 may, for example, be considered by a gesture command input detector 106 (FIG. 1) in determining whether a mobile device 102 may be in a gesture command input ready state 330.

Figure 4:
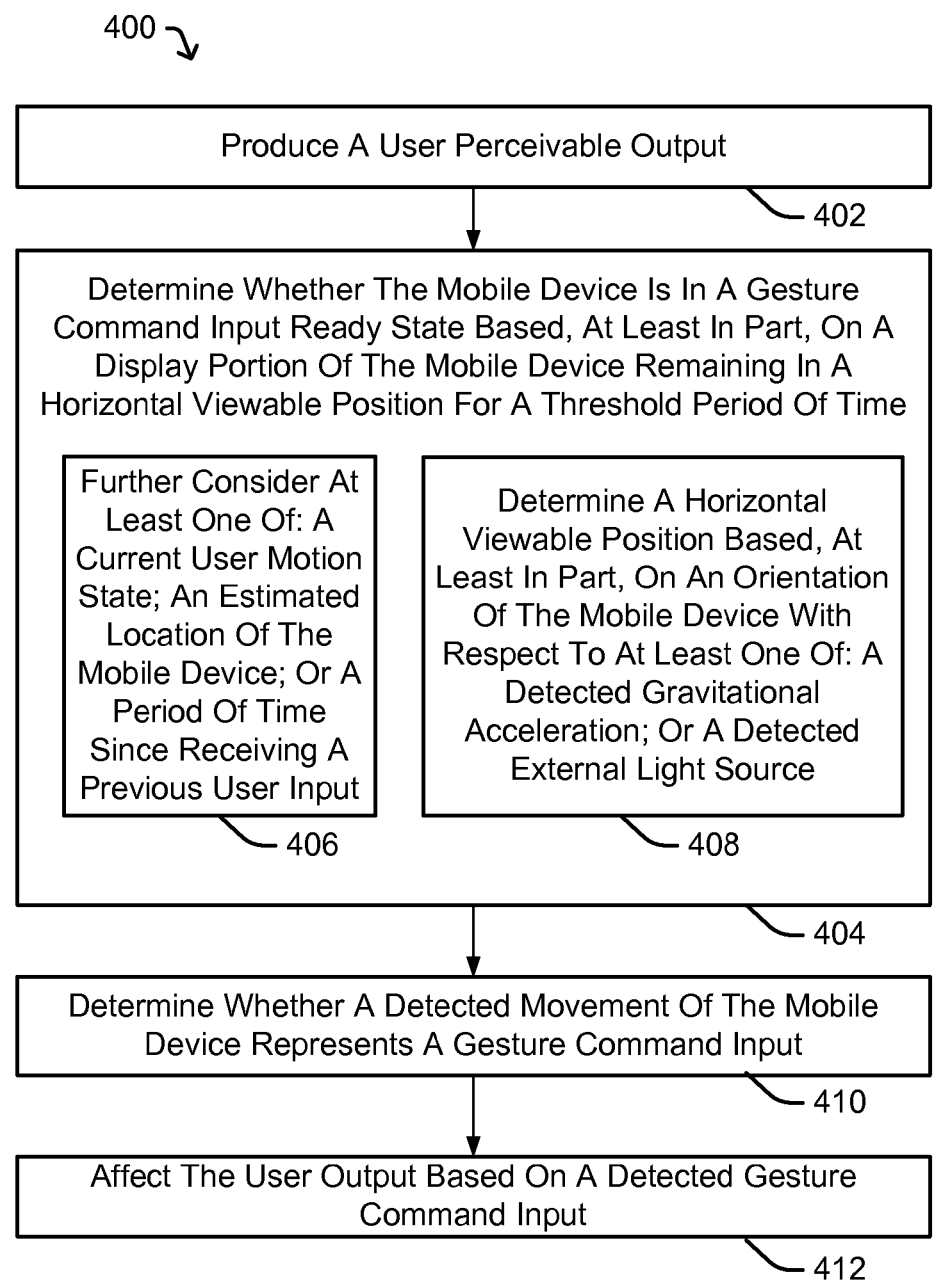
FIG. 4 is a flow diagram illustrating certain features of an example process or method to determine whether a mobile device is in a gesture command input ready state, in accordance with an implementation.

Attention is drawn next to FIG. 4, which is a flow diagram illustrating an example process in the form of a method 400 for use in a mobile device 102 (FIG. 1), in accordance with an implementation.

At example block 402, a user perceivable output may be produced. For example, one or more output devices may be used to generate at least one of: an audible output, a visual output, or a tactile output. One or more functions and/or services performed by or otherwise associated with the mobile device may initiate the user perceivable output.

At example block 404, it may be determined whether a mobile device is in a gesture command input ready state based, at least in part, on a display portion of the mobile device remaining in a horizontal viewable position for a threshold period of time. In certain example implementations, at example block 406, it may be determined whether a mobile device is in a gesture command input ready state based, at least in part, at least one of a current user motion state, an estimated location of the mobile device, or passage of a second threshold period of time since receiving a previous user input. In certain example implementations, at example block 408, it may be determined whether a display portion of a mobile device is in a horizontal viewable position based, at least in part, on an orientation of the mobile device with respect to at least one of: a detected gravitational acceleration, or a detected external light source.

At block 410, it may be determined whether a detected movement of a mobile device (e.g., by a user) represents a gesture command input. For example, a movement of the mobile device by a user in one or more directions according to a predetermined scheme (e.g., as programmed and/or recorded and stored as one or more electrical signals in a memory) may represent a particular user input.

At block 412, in response to a determined gesture command input, a user perceivable output (e.g., as produced at block 402) and/or other like associated function or service may be affected in some manner. For example, a user perceivable output that is being produced may be stopped.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
subsequent to initiation of a user perceivable output, determining whether said mobile device is in a gesture command input ready state based, at least in part, on a display portion of said mobile device remaining within a threshold angle of a horizontal viewable position for a threshold period of time and an estimated location of said mobile device indicating that said mobile device is in an environment where movements of said mobile device corresponding to gesture command inputs are likely to be distinguishable from movements of said mobile device that do not correspond to gesture command inputs;
with said mobile device in said gesture command input ready state, determining whether a detected movement of said mobile device represents a gesture command input; and in response to a determination that said detected movement represents said gesture command input, affecting said user perceivable output.

2. The method as recited in claim 1, and further comprising, at said mobile device:
determining whether said mobile device is in said gesture command input ready state based further, at least in part, on a current user motion state.

3. The method as recited in claim 2, wherein said mobile device is determined to be in said gesture command input ready state in response to said current user motion state indicating that a user is not walking.

4. The method as recited in claim 1, and further comprising, at said mobile device:
determining whether said mobile device is in said gesture command input ready state based further, at least in part, on a second threshold period of time since receiving a user input.

5. The method as recited in claim 1, and further comprising, at said mobile device:
determining whether said display portion of said mobile device is within the threshold angle of said horizontal viewable position based, at least in part, on an orientation of said mobile device with respect to a detected gravitational acceleration.

6. The method as recited in claim 1, and further comprising, at said mobile device:
determining whether said display portion of said mobile device is within the threshold angle of said horizontal viewable position based, at least in part, on an orientation of said mobile device with respect to a detected external light source.

7. The method as recited in claim 1, and further comprising, at said mobile device:
in response to affecting said user perceivable output, initiating an additional user perceivable output.

8. The method as recited in claim 1, wherein affecting said user perceivable output comprises stopping said user perceivable output.

9. The method as recited in claim 1, and further comprising, at said mobile device:
producing said user perceivable output by generating at least one of: an audible output, a visual output, or a tactile output.

10. An apparatus for use in a mobile device, the apparatus comprising:
means for initiating a user perceivable output;
means for determining whether said mobile device is in a gesture command input ready state subsequent to initiating said user perceivable output based, at least in part, on a display portion of said mobile device remaining within a threshold angle of a horizontal viewable position for a threshold period of time and an estimated location of said mobile device indicating that said mobile device is in an environment where movements of said mobile device corresponding to gesture command inputs are likely to be distinguishable from movements of said mobile device that do not correspond to gesture command inputs;
means for detecting movement of said mobile device;
means for determining whether said detected movement of said mobile device represents a gesture command input with said mobile device in said gesture command input ready state; and
means for affecting said user perceivable output, in response to said determined gesture command input.

11. The apparatus as recited in claim 10, and further comprising:
means for determining a current user motion state; and
means for determining whether said mobile device is in said gesture command input ready state based further, at least in part, on said determined current user motion state.

12. The apparatus as recited in claim 11, wherein said mobile device is determined to be in said gesture command input ready state in response to said determined current user motion state indicating that a user is not walking.

13. The apparatus as recited in claim 10, and further comprising:
means for estimating a location of said mobile device.

14. The apparatus as recited in claim 10, and further comprising:
means for receiving a user input other than said gesture command input;
means for determining whether a second threshold period of time has passed since receiving said user input; and
wherein said means for determining whether said mobile device is in said gesture command input ready state based further, at least in part, on a determination that said second threshold period of time has passed since receiving said user input.

15. The apparatus as recited in claim 10, and further comprising, at said mobile device:
means for detecting a gravitational acceleration;
means for determining an orientation of said mobile device with respect to said detected gravitational acceleration; and
means for determining whether said display portion of said mobile device is within the threshold angle of said horizontal viewable position based, at least in part, on said orientation of said mobile device with respect to said detected gravitational acceleration.

16. The apparatus as recited in claim 10, and further comprising, at said mobile device:
means for detecting an external light source;
means for determining an orientation of said mobile device with respect to said detected external light source; and
means for determining whether said display portion of said mobile device is within the threshold angle of said horizontal viewable position based, at least in part, on said orientation of said mobile device with respect to said detected external light source.

17. The apparatus as recited in claim 10, and further comprising, at said mobile device:
means for initiating an additional user perceivable output via said means for providing said user perceivable output, in response to affecting said user perceivable output.

18. The apparatus as recited in claim 10, wherein affecting said user perceivable output comprises stopping said user perceivable output.

19. The apparatus as recited in claim 10, wherein said user perceivable output comprises at least one of: an audible output, a visual output, or a tactile output.

20. A mobile device comprising:
one or more output devices, comprising at least a display device;
one or more inertial sensors; and
a processing unit configured to, subsequent to initiation of a user perceivable output via at least one of said one or more output devices;
determine whether said mobile device is in a gesture command input ready state based, at least in part, on said display device remaining within a threshold angle of a horizontal viewable position for a threshold period of time and an estimated location of said mobile device indicating that said mobile device is in an environment where movements of said mobile device corresponding to gesture command inputs are likely to be distinguishable from movements of said mobile device that do not correspond to gesture command inputs;

determine whether a movement of said mobile device represents a gesture command input with said mobile device in said gesture command input ready state, said movement being based, at least in part, on at least one signal associated with at least one of said one or more said inertial sensors; and affect said user perceivable output, in response to said determined gesture command input.

21. The mobile device as recited in claim 20, said processing unit, subsequent to said initiation of said user perceivable output, to further:

obtain current user motion state; and determine whether said mobile device is in said gesture command input ready state based further, at least in part, on said current user motion state.

22. The mobile device as recited in claim 21, wherein said mobile device is determined to be in said gesture command input ready state in response to said current user motion state indicating that a user is not walking.

23. The mobile device as recited in claim 20, said processing unit, subsequent to said initiation of said user perceivable output, to further:

obtain the estimated location of said mobile device.

24. The mobile device as recited in claim 20, said processing unit, subsequent to said initiation of said user perceivable output, to further:

determine a time of a previous user input other than said gesture command input;

determine whether a second threshold period of time has passed since receiving said previous user input; and determine whether said mobile device is in said gesture command input ready state based further, at least in part, on a determination that said second threshold period of time has passed since receiving said previous user input.

25. The mobile device as recited in claim 20, said processing unit, subsequent to said initiation of said user perceivable output, to further:

determine an orientation of said mobile device with respect to a detected gravitational acceleration based, at least in part, on said at least one signal associated with said at least one of said one or more said inertial sensors; and determine whether said display device is within the threshold angle of said horizontal viewable position based, at least in part, on said orientation of said mobile device with respect to said detected gravitational acceleration.

26. The mobile device as recited in claim 20, and further comprising, at said mobile device:

a sensor to detect light from an external light source; and wherein said processing unit, subsequent to said initiation of said user perceivable output, to further:

determine whether said display device is within the threshold angle of said horizontal viewable position based, at least in part, on an orientation of said mobile device with respect to said detected light.

27. The mobile device as recited in claim 20, said processing unit, subsequent to said initiation of said user perceivable output, to further:

initiate an additional user perceivable output via at least one of said one or more output devices, in response to affecting said user perceivable output.

28. The mobile device as recited in claim 20, said processing unit to further:

affect said user perceivable output by stopping said user perceivable output.

29. The mobile device as recited in claim 20, wherein at least one of said one or more output devices generates at least one of: an audible output, a visual output, or a tactile output.

30. An article comprising:

a non-transitory computer readable medium having stored therein computer executable instructions executable by a processing unit of a mobile device to, subsequent to initiation of a user perceivable output:

determine whether said mobile device is in a gesture command input ready state based, at least in part, on a display portion of said mobile device remaining within a threshold angle of a horizontal viewable position for a threshold period of time and an estimated location of said mobile device indicating that said mobile device is in an environment where movements of said mobile device corresponding to gesture command inputs are likely to be distinguishable from movements of said mobile device that do not correspond to gesture command inputs;

with said mobile device in said gesture command input ready state, determine whether a detected movement of said mobile device represents a gesture command input; and in response to a determination that said detected movement represents said gesture command input, affect said user perceivable output.

31. The article as recited in claim 30, said computer executable instructions being further executable by said processing unit to:

determine whether said mobile device is in said gesture command input ready state based further, at least in part, on a current user motion state.

32. The article as recited in claim 31, wherein said mobile device is determined to be in said gesture command input ready state in response to said current user motion state indicating that a user is not walking.

33. The article as recited in claim 30, said computer executable instructions being further executable by said processing unit to:

determine whether said mobile device is in said gesture command input ready state based further, at least in part, a second threshold period of time since receiving a user input.

34. The article as recited in claim 30, said computer executable instructions being further executable by said processing unit to:

determine whether said display portion of said mobile device is within the threshold angle of said horizontal viewable position based, at least in part, on an orientation of said mobile device with respect to a detected gravitational acceleration.

35. The article as recited in claim 30, said computer executable instructions being further executable by said processing unit to:

determine whether said display portion of said mobile device is within the threshold angle of said horizontal viewable position based, at least in part, on an orientation of said mobile device with respect to a detected external light source.

36. The article as recited in claim 30, said computer executable instructions being further executable by said processing unit to:
    in response to affecting said user perceivable output, initiate an additional user perceivable output.

37. The article as recited in claim 30, wherein said processing unit affects said user perceivable output by stopping said user perceivable output.

38. The article as recited in claim 30, wherein said user perceivable output comprises at least one of: an audible output, a visual output, or a tactile output.

* * * * *